(12) United States Patent
Brunsch et al.

(10) Patent No.: US 11,584,161 B2
(45) Date of Patent: Feb. 21, 2023

(54) WHEEL HUB AND A SYSTEM FORMED OF WHEEL HUB AND BRAKE ELEMENT

(71) Applicant: SAF-HOLLAND GmbH, Bessenbach (DE)

(72) Inventors: Bernd Brunsch, Dreieich (DE); Jonas Mattern, Alzenau (DE); Muhammet Arpaci, Aschaffenburg (DE); Elmar Weber, Dülmen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 430 days.

(21) Appl. No.: 16/630,721

(22) PCT Filed: May 24, 2018

(86) PCT No.: PCT/EP2018/063633
§ 371 (c)(1),
(2) Date: Jan. 13, 2020

(87) PCT Pub. No.: WO2019/015831
PCT Pub. Date: Jan. 24, 2019

(65) Prior Publication Data
US 2021/0094347 A1 Apr. 1, 2021

(30) Foreign Application Priority Data
Jul. 18, 2017 (DE) ..................... 10 2017 116 132.5
Jul. 19, 2017 (DE) ..................... 10 2017 116 309.3

(51) Int. Cl.
*F16D 65/12* (2006.01)
*B60B 27/00* (2006.01)
*F16D 65/02* (2006.01)

(52) U.S. Cl.
CPC ...... *B60B 27/0052* (2013.01); *B60B 27/0057* (2013.01); *F16D 65/123* (2013.01);
(Continued)

(58) Field of Classification Search
CPC ............ B60B 27/0052; B60B 27/0057; F16D 65/123–128
(Continued)

(56) References Cited

U.S. PATENT DOCUMENTS 2,753,959 A 7/1956 Johnson
4,273,218 A * 6/1981 Morris ................. F16D 65/123
188/218 XL
8,061,785 B2 * 11/2011 Llg ......................... F16D 65/12
188/218 XL
(Continued)

FOREIGN PATENT DOCUMENTS

DE 698 07 957 T2 1/1998
DE 10 2004 034 361 B3 2/2006
DE 10 2005 032 745 A1 2/2006
(Continued)

OTHER PUBLICATIONS

European Patent Office; International Search Report; dated Oct. 11, 2018.

*Primary Examiner* — Christopher P Schwartz
(74) *Attorney, Agent, or Firm* — Price Heneveld LLP

(57) ABSTRACT

A wheel hub for a utility vehicle includes a brake element abutment surface against which a brake element bears in an installed state, and a positive-locking arrangement which interacts in positively locking fashion, as viewed in a direction of rotation, with the brake element in the installed state, and/or a receiving region for a positive-locking arrangement which interacts in positively locking fashion, as viewed in a direction of rotation, with the brake element in the installed state.

24 Claims, 9 Drawing Sheets

(52) U.S. Cl.
CPC .................. *B60B 2900/112* (2013.01); *B60B 2900/113* (2013.01); *B60B 2900/114* (2013.01); *B60B 2900/115* (2013.01); *B60B 2900/131* (2013.01); *B60B 2900/311* (2013.01); *B60B 2900/323* (2013.01); *B60B 2900/325* (2013.01); *B60B 2900/3314* (2013.01); *B60B 2900/513* (2013.01); *B60B 2900/541* (2013.01); *F16D 2065/1384* (2013.01)

(58) Field of Classification Search
USPC .............................. 188/18 A, 218 A, 218 XL
See application file for complete search history.

(56) References Cited

U.S. PATENT DOCUMENTS

| | | | |
|---|---|---|---|
| 8,651,249 B2* | 2/2014 | Lee | F16D 65/123 |
| | | | 188/218 XL |
| 9,897,154 B2* | 2/2018 | Root | B60B 27/0052 |
| 2004/0050632 A1* | 3/2004 | Gotti | B60B 27/001 |
| | | | 188/71.1 |
| 2016/0280006 A1 | 9/2016 | Pahle | |
| 2020/0025268 A1* | 1/2020 | Sabeti | F16D 65/123 |
| 2021/0039435 A1* | 2/2021 | White | B60B 27/001 |

FOREIGN PATENT DOCUMENTS

| | | |
|---|---|---|
| DE | 10 2013 113 550 A1 | 6/2015 |
| EP | 0849487 A2 | 6/1998 |
| EP | 0906855 A2 | 4/1999 |
| GB | 1510619 | 5/1978 |

\* cited by examiner

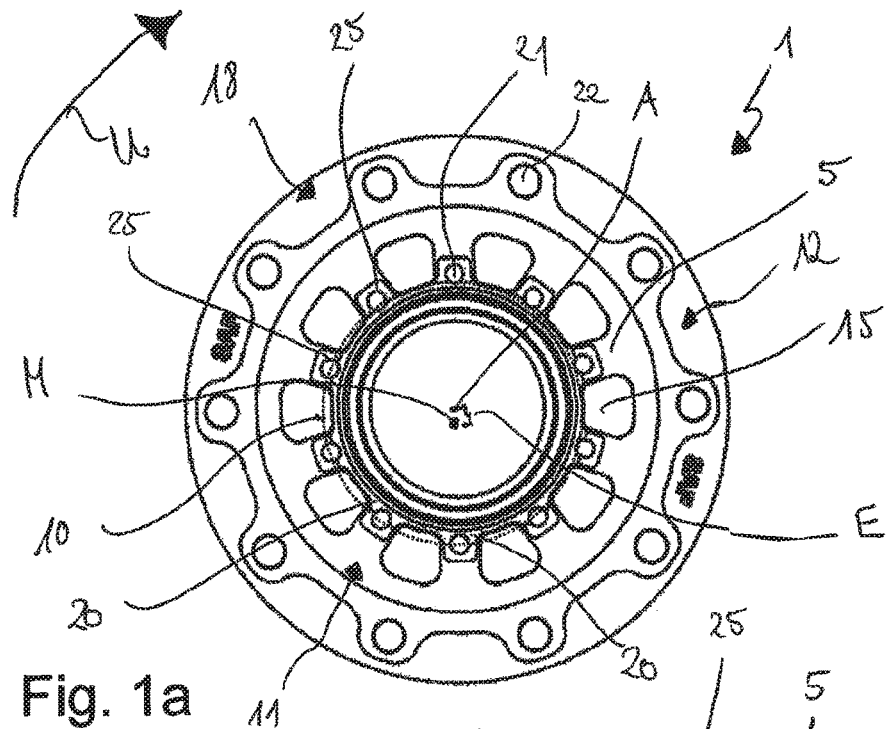
Fig. 1a
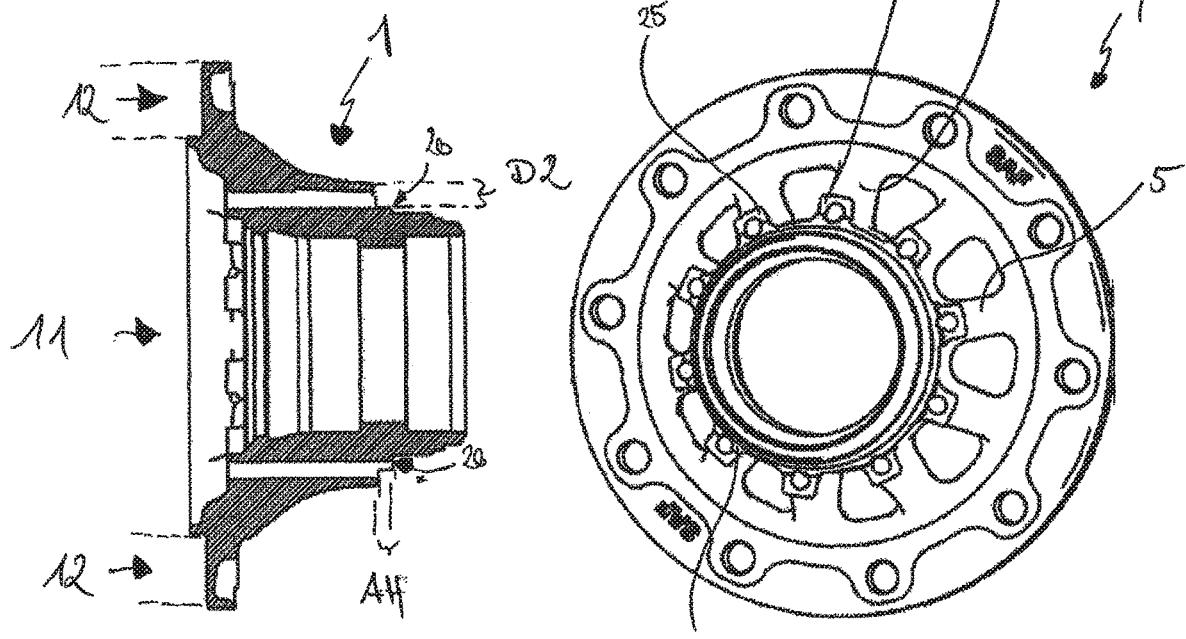
Fig. 1b
Fig. 1c

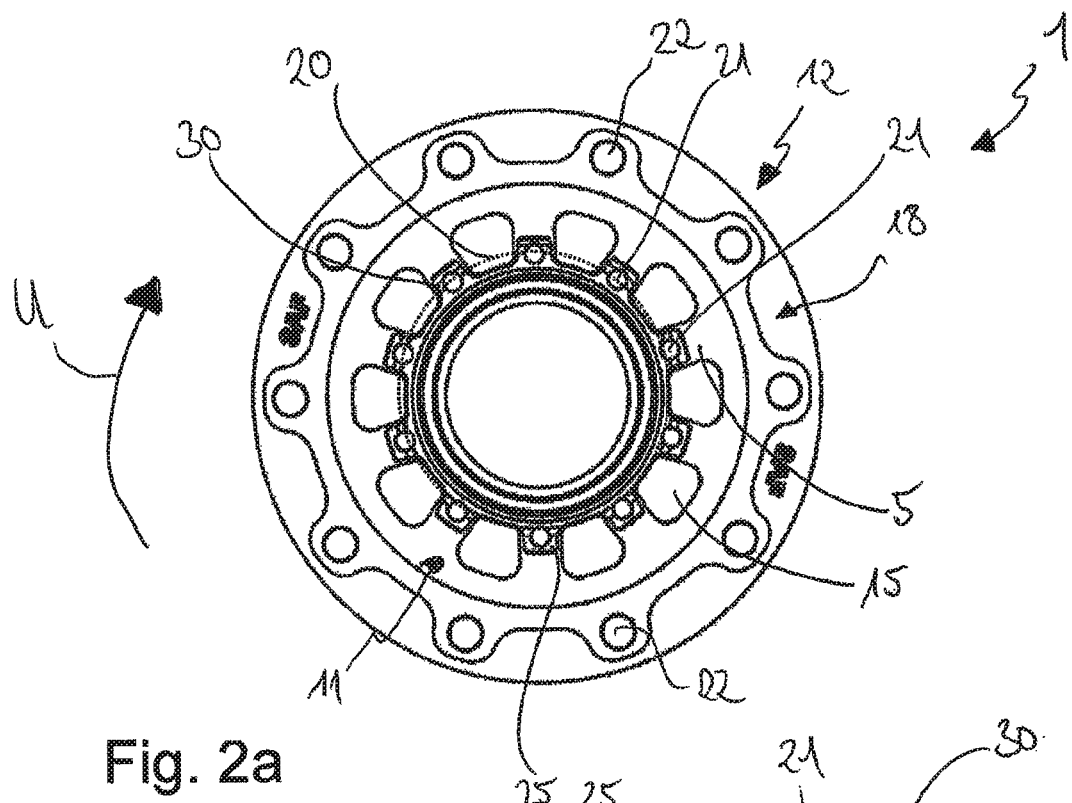
Fig. 2a
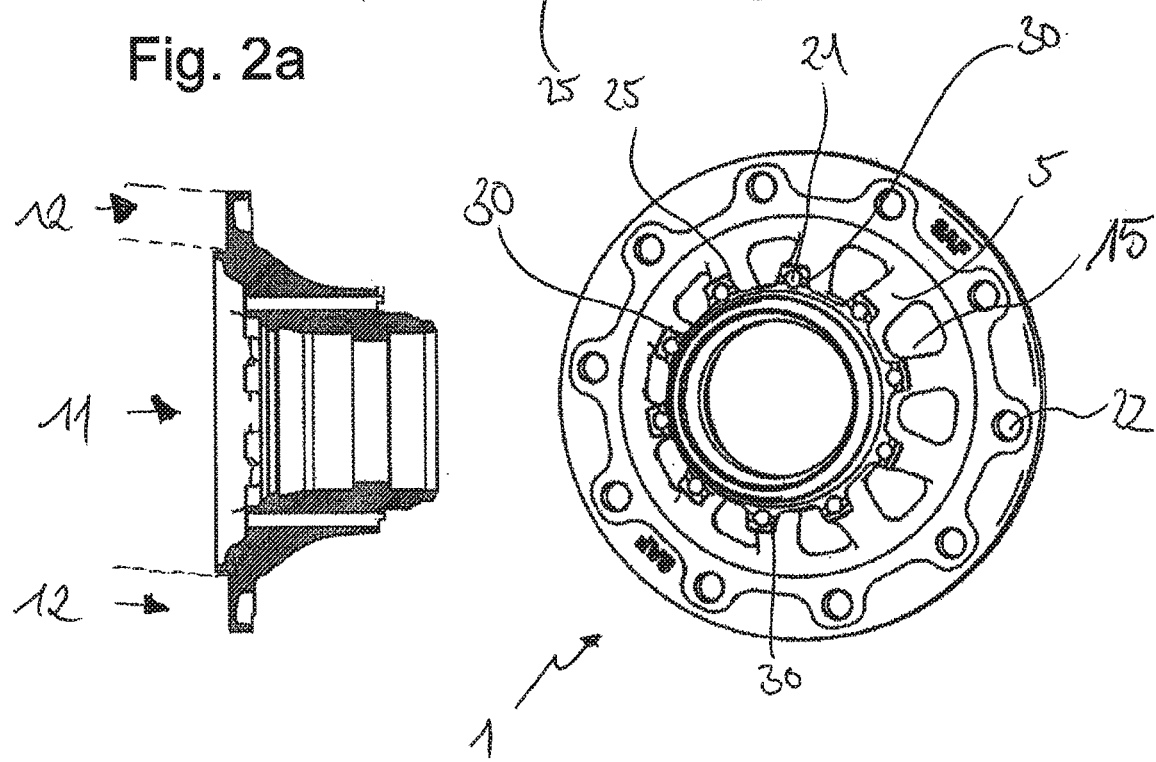
Fig. 2b
Fig. 2c

WHEEL HUB AND A SYSTEM FORMED OF WHEEL HUB AND BRAKE ELEMENT

BACKGROUND OF THE INVENTION

The present invention relates to a wheel hub and to a system composed of a brake element and of a wheel hub.

Wheel hubs are well known from the prior art. They serve for the attachment of a wheel to an axle element, for example to an axle of a utility vehicle. Here, it is commonly the case that brake element, such as for example brake disks or brake drums, are attached rotationally conjointly to the wheel hub. Brake disks are typically fixed axially by means of screws engaging into the wheel hub. This axial fixing by means of the screw leads here to a non-positively locking connection at an interface between the wheel hub and the brake disk bearing against the wheel hub. In order to withstand the loads that arise during operation, in the prior art, relatively high demands are placed on a fastening means by which the brake disk is fixed axially to the wheel hub.

It is an object of the present invention to provide a wheel hub which has, in relation to the prior art, an improved interface for the attachment of a brake element, in particular with regard to a load-bearing capacity of the interface.

SUMMARY OF THE INVENTION

According to the invention, a wheel hub, in particular wheel hub for a utility vehicle, is provided, comprising:

a brake element abutment surface against which a brake element, in particular a brake disk or a brake drum, bears in an installed state, and a positive-locking arrangement which interacts in positively locking fashion, as viewed in a direction of rotation, with the brake element in the installed state, and/or a receiving region for a positive-locking arrangement which, as viewed in a direction of rotation, interacts in positively locking fashion with the brake element in the installed state.

In relation to the prior art, the wheel hub according to the invention permits positive locking between the brake element and the wheel hub in a direction of rotation in addition to the frictionally locking connection at the interface between the wheel hub and the brake element bearing against the wheel hub. This positive locking improves the accommodation of braking torques that arise during the operation of the wheel hub. This in some cases also yields the advantage that an axial fixing of the brake element to the wheel hub by means of a fastening element, such as a screw, is relieved of load. It is consequently also possible to reduce the number of required fastening means because, according to the invention, the functionality of the fastening means is restricted substantially to axial securing of the brake element. The direction of rotation is basically to be understood to mean the direction along which a volume element of the wheel hub moves when the latter rotates about a wheel axis during the operation of the wheel hub. Here, provision is preferably made whereby the positive-locking arrangement is oriented such that the positive-locking arrangement interacts with the brake element during braking, in particular during braking of a vehicle traveling in a forward direction. The brake element preferably has a brake-element-side positive-locking arrangement which is of complementary design with respect to the positive-locking arrangement of the wheel hub. In other words, the brake-element-side positive-locking arrangement may therefore be formed as a single piece with the brake element and/or the positive-locking arrangement of the wheel hub may be formed as a single piece with the wheel hub. In order to achieve a particularly reliable and durable transmission of torque, the brake-element-side positive-locking arrangement should make, in particular direct, contact with the positive-locking arrangement of the wheel hub. A further advantage of the positive-locking arrangement is that the brake element can be oriented in a positionally fixed manner during the installation process. That is to say, the brake element assumes a fixed position, in particular angular position, in relation to the wheel hub. For example, the positive-locking arrangement of the wheel hub abuts against the brake-element-side positive-locking arrangement as soon as the brake element has assumed the intended position or angular position. This orientation may be expedient for example during the installation of the brake element in order to bring holes in the brake element into axial overlap with primary cutouts provided for the fastening means. Furthermore, by means of a shape or contour of the positive-locking arrangement, it is possible to define which brake element can be used together with the wheel hub. This advantageously prevents an unsuitable brake element from being inadvertently fastened to the wheel hub. It is furthermore conceivable that the positive-locking arrangement additionally interacts in positively locking fashion in a radial direction with the brake element.

In a further embodiment, provision is made whereby the positive-locking arrangement is arranged in the region of the brake element abutment surface or is part of the brake element abutment surface. Here, provision is preferably made whereby the brake element is fixed to the brake element abutment surface by a fastening means, for example a screw. In this way, the positive-locking arrangement is advantageously arranged in the region in which the axial fixing of the brake element is also realized. Since the brake element bears against the brake element abutment surface in any case in the installed state, the formation of the positive-locking arrangement on the brake element abutment surface has proven to be advantageous because, in this way, no additional formation is required on the wheel hub to form the positive-locking arrangement. The region of the brake element abutment surface is to be understood in particular to mean that region which directly adjoins the brake element abutment surface as viewed in an axial direction and which extends substantially as far as 10%, preferably as far as 5%, of the total extent of the wheel hub in an axial direction. In this way, a particularly compact construction can be realized.

Provision is preferably made whereby the brake element abutment surface is, as viewed in an axial direction, offset with respect to an end side—directed preferably toward the inside of the vehicle or toward the same side as the brake element abutment surface—of the wheel hub by a distance, wherein a ratio between said distance and a total length, measured in an axial direction, assumes a value between 0.05 and 0.5, preferably between 0.15 and 0.4, and particularly preferably between 0.28 and 0.38.

In a further embodiment, provision is made whereby the positive-locking arrangement is formed as a shoulder, as a collar and/or as a groove in the wheel hub, in particular in the brake element abutment surface. A shoulder, a collar and/or a groove can advantageously be produced relatively easily, for example by cutting machining of the brake element abutment surface. Here, the shoulder, the collar or the groove form positive-locking surfaces which, in the installed state, bear against complementary brake-element-side positive-locking arrangement and interact in positively locking fashion therewith as viewed in a direction of rotation. Preferably, the shoulders or the positive-locking surfaces are oriented such that the shoulders or positive-locking surfaces interact, as viewed in a direction of rotation, with the brake element during braking.

Provision is expediently made whereby a ratio between a shoulder height and/or groove depth and a thickness, measured in an axial direction in the installed state, of the brake element assumes a value between 0.15 and 0.75, preferably between 0.23 and 0.55 and particularly preferably between 0.34 and 0.46. With the ratio between 0.23 and 0.55, a shoulder height or groove depth is provided which provides a positive-locking surface large enough to accommodate the braking torque from the brake element. The ratio of 0.34 to 0.46 permits a relatively small amount of material removal from the brake element abutment surface, such that the positive-locking arrangement can be produced easily and quickly.

In a further embodiment of the present invention, provision is made whereby a common edge profile extends over multiple shoulders as viewed along the direction of rotation. A common edge profile is preferably to be understood to mean an imaginary line or surrounding contour between the radially outer edges of the shoulder, of the groove or of the collar, which line or contour extends over multiple shoulders or brake element abutment surfaces. The common edge profile is preferably a circle. An elliptical or circular-segment-shaped form is however also conceivable. By means of a common edge profile which extends over multiple shoulders, it is advantageously possible to define a unique orientation of the brake element relative to the wheel hub, because the shoulders differ from one another from shoulder to shoulder owing to their characteristic as a common positive-locking arrangement. It is alternatively also conceivable for each shoulder to provide a dedicated positive-locking arrangement. In this way, it is possible to realize a number of possible orientations of the brake element relative to the wheel hub which corresponds to the number of shoulders.

It is preferable for the edge profile or the contour surrounding the positive-locking arrangement to surround the axis of rotation at least in certain regions, preferably entirely. A particularly reliable transmission of torque can be realized in this way. Here, the edge profile is preferably a circle because, in this way, this and the associated positive-locking arrangement can be produced particularly easily, in particular by turning, such that costs can be saved.

Provision is expediently made whereby the positive-locking arrangement is discontinuous as viewed in a direction of rotation. This advantageously permits the formation of free spaces between the individual shoulders or brake element abutment surface, whereby the total weight of the wheel hub can be reduced. The positive-locking arrangement is preferably restricted, as viewed in a direction of rotation, to the brake element abutment surfaces, such that no additional structural formation is required on the wheel hub for the positive-locking arrangement. It is alternatively also conceivable for the positive-locking arrangement to extend over multiple brake element abutment surfaces and between these. In this way, it is possible for a higher braking torque to be accommodated by the positive-locking arrangement, because the positive locking is no longer restricted to the region of a single brake element abutment surface.

In a further embodiment, provision is made whereby, for force boosting during a rotation of the brake element, in particular about an axis of rotation, the positive-locking arrangement has an edge profile which extends in a direction of rotation and which runs eccentrically with respect to the axis of rotation. In this way, a shoulder or a positive-locking surface can be provided which runs in a wedge-shaped manner with respect to the direction of rotation. A consequence is that, during a braking operation, the braking torque leads to further wedging of brake element and wheel hub, such that the positive-locking surface can at least partially accommodate the braking torque caused during the braking operation.

In a further embodiment, provision is made whereby a central point, assigned to the edge profile, is offset with respect to the axis of rotation by an eccentricity. In this way, a positive-locking connection can be produced which is particularly easy to produce and reliable.

Preferably, the ratio between the eccentricity to the extent of the brake element abutment surface as measured in a radial direction assumes a value between 0.2 and 0.8, preferably between 0.6 and 0.8, and particularly preferably between 0.7 and 0.8. In this way, it is advantageously possible to realize the largest possible eccentricity, in the case of which at the same time all shoulders terminate on the brake element abutment surface and contribute to the common edge profile. In particular for the ratio between 0.7 and 0.8, it has been found that all shoulders have a stability or thickness sufficient to accommodate a braking torque that arises.

Provision is expediently made whereby the receiving region is formed as a recess in the wheel hub, which recess extends along the direction of rotation and the base surface of which recess is to be assigned an edge profile which runs eccentrically with respect to the axis of rotation and/or which provides a stop as viewed in a direction of rotation. Preferably, the receiving region formed as a recess in the wheel hub extends over multiple brake element abutment surfaces as viewed in a direction of rotation, and/or is offset with respect thereto in an axial direction. Provision is furthermore advantageously made whereby the receiving region is provided for the accurately fitting arrangement of the positive-locking arrangement. By means of the eccentric edge profile of the base surface, it is possible in a braking situation for the acting braking torque to be transmitted via the positive-locking arrangement to the base surface and thus to the wheel hub. Here, the positive-locking arrangement preferably becomes jammed or wedged together with the receiving region and a brake-element-side receiving region of the brake element. Furthermore, the receiving region is advantageously designed such that positive locking in a direction of rotation can be realized irrespective of a rotational direction or of a direction of the braking torque. For this purpose, the receiving region is of symmetrical design. It is however also conceivable for the receiving region to be adapted to the fact that braking during reverse travel generally gives rise to a lower braking torque, and to correspondingly be of asymmetrical design as viewed in the direction of rotation.

In a further embodiment, provision is made whereby a ratio between a length of the receiving region as measured in a direction of rotation to the total circumference of the wheel hub at the same height assumes a value between 0.2 and 0.7, preferably between 0.4 and 0.6 and particularly preferably between 0.45 and 0.55. In this way, a relatively long receiving region can be realized, which makes it possible for the accommodated braking torque to be distributed over a corresponding area.

Provision is expediently made whereby a primary cutout is provided for the axial fixing of the brake element, wherein the primary cutout opens out in the brake element abutment surface. For example, for the axial fixing, a fastening means, for example a screw, is provided, which in the installed state engages through the brake element and engages into the primary cutout. By means of the axial fixing of the brake element, it is advantageously ensured that positive locking as viewed in a direction of rotation is maintained between the brake element and the positive-locking arrangement. Here, during the installation process, provision is made whereby the brake element is firstly oriented such that the positive locking between positive-locking arrangement and brake-element-side positive-locking arrangement as viewed in a direction of rotation is formed, and subsequently the axial fixing of the brake element by the fastening means is realized.

The wheel hub advantageously has a multiplicity of primary cutouts, wherein the primary cutouts are arranged on a circular path, and wherein said circular path is formed eccentrically with respect to the axis of rotation. In this way, an asymmetry of the brake element arrangement can be achieved, which in particular achieves a rectification of modes, such that, in particular, vibrational instabilities can be reduced and/or prevented. It is particularly preferable if the eccentricity of the primary cutouts is the same as that of the positive-locking arrangement. In this way, particularly uniform loading of the wheel hub and/or of the brake element is achieved.

Preferably, a wheel hub is provided, furthermore comprising a collar region which is situated at the outside as viewed in a radial direction, and a core region which is situated at the inside as viewed in a radial direction, wherein, as viewed in an axial direction, the core region situated at the inside is thicker than the collar region situated at the outside, and wherein the wheel hub has, in the core region situated at the inside, the substantially axially running primary cutout for the attachment of a brake element. In this way, it is advantageously possible for higher bracing forces to be realized, which in turn permit higher braking torques. Furthermore, thermal effects arising from the generation of heat in the brake element during braking can be compensated more effectively in relation to wheel hubs in which the primary cutouts for the attachment of the brake element permit shorter clamping lengths. A collar region is basically to be understood to mean an annular-disk-shaped or trim-like termination of the wheel hub. In the installed state of the wheel hub, the collar region forms the outermost circumferential region of the wheel hub, with which the wheel hub preferably terminates as viewed in a radial direction and to one side in an axial direction. The collar region is advantageously designed as an attachment region for a wheel rim, or serves for the arrangement of a wheel rim. For example, the ratio of the radial extent of the collar region to the diameter of the wheel hub assumes a value between 0.1 and 0.3, preferably between 0.15 and 0.25 and particularly preferably between 0.21 and 0.24. Here, in the installed state, the collar region faces toward the visible side of the vehicle. In particular, provision is made whereby the collar region, as viewed in a radial direction, substantially has a constant thickness measured in an axial direction. Here, a thickness is to be understood in particular to mean the extent of the collar region taken up by the collar region rotating about an axis of rotation during operation. Any local recesses are thus disregarded in the determination of the thickness. Provision is furthermore made whereby the core region, as viewed in a radial direction, varies in terms of its axially measured thickness. The core region preferably comprises a central cavity which is provided for receiving an axle element. Here, the core region is provided in particular for abutment against the axle element and, in the installed state, encases the axle element, for example an axle stub, at least in regions. Provision is furthermore preferably made whereby the core region and the collar region directly adjoin one another or transition into one another in a radial direction. Provision is preferably made whereby the ratio of the radial extent of the core region to the diameter of the wheel hub assumes a value between 0.3 and 0.7, preferably between 0.35 and 0.55 and particularly preferably between 0.4 and 0.5. Provision is preferably made whereby the primary cutout is a bore, in particular a through bore. Provision is furthermore preferably made whereby the wheel hub is provided for the attachment of a flat brake element, for example a brake disk with a thickness of 1 to 3 cm in an axial direction. It is also conceivable for the primary cutout to be arranged in the half facing toward the axis of rotation, preferably in a first third facing toward the axis of rotation, or particularly preferably in a first quarter facing toward the axis of rotation, of the core region or of the wheel hub.

In particular, provision is made whereby the wheel hub is of single-piece or integral form, that is to say the wheel hub is not assembled from multiple constituent parts, but rather the brake element, axle and wheel or wheel rim can be attached to a single-piece component, that is to say the wheel hub. For example, the wheel hub is forged or cast as a single piece.

In a further embodiment, provision is made whereby the core region comprises substantially radially running rib elements, wherein, in particular, the brake element abutment surface is arranged on an end side of the rib element. In this context, "substantially radially running" is to be understood to mean that the rib elements may form an angle of at most 10°, preferably of at most 5°, and particularly preferably of at most 2°, with the ideal radial direction. Here, the radial direction is the radial direction with respect to the axis of rotation of the wheel hub. It is particularly expedient, in order to realize a compact wheel hub, if the rib elements have the primary cutouts.

It is particularly preferable, in order to realize a compact and structural-space-saving wheel hub, if the rib elements form a part of the core region and/or, in particular exclusively, connect the core region to the collar region. Here, "connect" may be understood inter alia to mean that the rib elements are, in particular exclusively, designed or responsible for the transmission of force and/or torque between the core region and the collar region.

Expediently, each rib element surrounds exactly one primary cutout. In this way, it is possible to realize narrower rib elements in relation to the alternatively preferred rib elements with multiple primary cutouts. Preferably, as viewed in a direction of rotation, the rib elements open out centrally in a region between two mutually adjacent secondary cutouts. Preferably, the primary cutouts are arranged, as viewed in a radial direction, in that region of the rib element in which the rib elements, in particular outer lateral surfaces assigned to the rib element, run substantially axially with respect to the wheel axis. In other words: The primary cutout is formed into the rib element at its end of the wheel axis averted from the collar region.

Likewise provided according to the invention is a brake element for a wheel hub, in particular for a wheel hub according to the invention, wherein the brake element has a brake-element-side positive-locking arrangement which interacts in positively locking fashion, as viewed in a direction of rotation, with the wheel hub in the installed state. All of the features described for the wheel hub according to the invention, and the advantages thereof, can be analogously likewise transferred to the brake element for the wheel hub according to the invention, and vice versa.

Likewise provided according to the invention is a system composed of a brake element and of a wheel hub, wherein the wheel hub, in particular a wheel hub for a utility vehicle, has a brake element abutment surface against which a brake element bears in an installed state, and a positive-locking arrangement which interacts in positively locking fashion, as viewed in a direction of rotation, with the brake element in the installed state, and/or a receiving region for a positive-locking arrangement which interacts in positively locking fashion, as viewed in a direction of rotation, with the brake element in the installed state, wherein the positive-locking arrangement interacts, in the installed state, with a brake-element-side positive-locking arrangement, in particular a brake-element-side positive-locking arrangement which is of complementary design with respect to the positive-locking arrangement of the wheel hub. All of the features described for the wheel hub according to the invention, and the advantages thereof, can be analogously likewise transferred to the system according to the invention composed of the brake element and of the wheel hub, and vice versa.

BRIEF DESCRIPTION OF THE DRAWINGS

Further advantages and features will emerge from the following description of preferred embodiments of the subject matter according to the invention with reference to the appended figures. In the figures:

FIGS. 1a to 1c show a wheel hub according to a first exemplary embodiment of the present invention;

FIGS. 2a to 2c show a wheel hub according to a second exemplary embodiment of the present invention;

DETAILED DESCRIPTION OF THE PREFERRED EMBODIMENTS

Figures 3A, 3B, 3C:
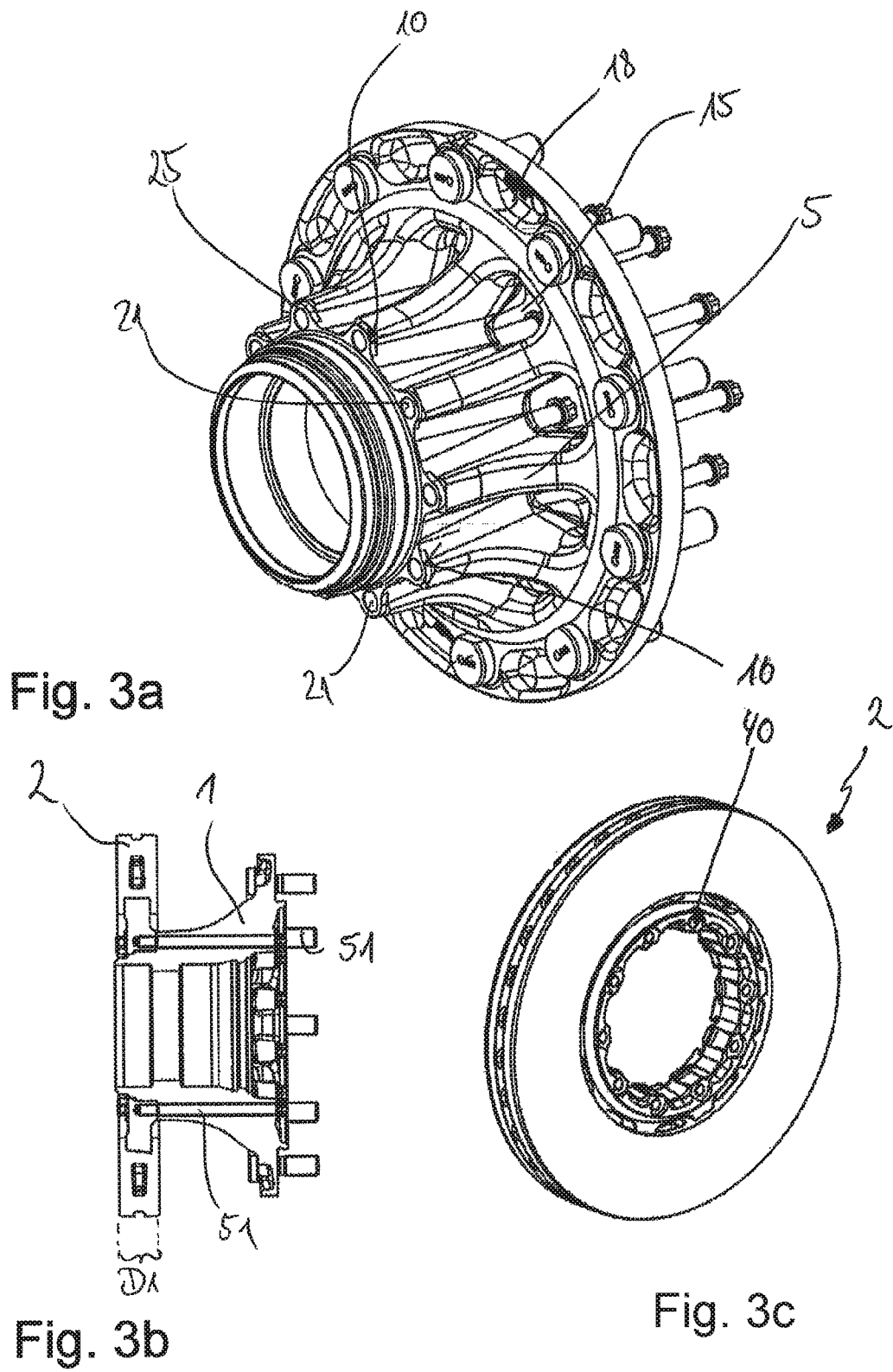
FIGS. 3a and 3c show a wheel hub according to a third exemplary embodiment of the present invention.

FIGS. 1a to 1c illustrate a wheel hub 1 according to a first exemplary embodiment of the present invention. Here, FIG. 1a illustrates a plan view in an axial direction, and FIG. 1b illustrates a sectional view along the axial direction (left) and a perspective view (right). A wheel hub 1 of said type serves for fastening a wheel to an axle element, for example to a stub, to a shaft or to an axle. Aside from the attachment of the wheel, provision is furthermore made whereby a brake element 2 in the form of a brake disk is connected rotationally conjointly to the wheel hub 1. This is preferably a wheel hub 2 for a utility vehicle. In particular, provision is made whereby the wheel hub 1 is formed as a single piece or is of integral form. That is to say, on the single-piece wheel hub 1, there are provided both primary cutouts 21 for the attachment of the brake element 2 to the wheel hub 1 and secondary cutout 22 for the attachment of the wheel to the wheel hub 1. Major constituent parts of the wheel hub 1 of integral form are a collar region 12, which is situated at the outside as viewed in a radial direction, and a core region 11, which is situated at the inside as viewed in a radial direction, wherein the core region 11 is thicker than the collar region 12. The collar region 12 is preferably of substantially annular-disk-shaped form, that is to say a thickness of the collar region 12 measured in an axial direction is substantially constant as viewed in a radial direction in the collar region 12. Here, a thickness is to be understood in particular to mean a structural-space-filling extent of the collar region 12 which rotates about the axis of rotation A during operation. Local thinned material portions 18 in a direction of rotation U are disregarded in such a measurement. Preferably, such local thinned material portion 18 are, as viewed in the direction of rotation U, formed at regular or equidistant intervals into the collar region 12 in order to thereby advantageously reduce the overall weight of the wheel hub 1. For example, the thinned material portions 18 are arranged between two adjacent secondary cutouts 22 in a direction of rotation U. Here, the thinned material portions 18 are preferably recesses on the rear side of the collar region 12, that is to say on the side that faces toward the brake element 2 in the installed state. By contrast to the collar region 12, the thickness of the core region 11 measured in an axial direction changes with increasing radial distance from the axis of rotation A. Preferably, the thickness of the core region 11 is at a maximum in the region in which the wheel hub 1 bears against the axle element in the installed state. Provision is furthermore made whereby the core region 11 has substantially radially extending rib elements 5, wherein a clear region 15 forms between two adjacent rib elements 5. In particular, provision is made whereby the rib elements 5 are designed such that, as viewed in an axial direction, they run, in regions, parallel to the axis of rotation A and are curved radially outward toward the collar region 12. In this way, the wheel hub 1 widens radially as viewed in an axial direction. In the region in which the rib elements 5 run substantially parallel to the axis of rotation A, the rib elements 5, by way of their outer side, define an outer lateral surface 14. Provision is preferably made whereby a ratio between a distance A3 between the axis of rotation A and the outer lateral surface and the diameter D of the wheel hub 1 a value between 0.3 and 0.8, preferably between 0.45 and 0.75, particularly preferably between 0.48 and 0.58. Provision is furthermore made whereby a ratio between a length of the region in which the outer lateral surface runs substantially parallel to the axis of rotation A and a total length of the wheel hub 1 in an axial direction a value between 0.2 and 0.5, preferably between 0.25 and 0.45, and particularly preferably between 0.32 and 0.42 on. It is furthermore conceivable that the clear region 15 is arranged substantially in a line with respect to the thinned material portion 18 as viewed in a radial direction. Provision is furthermore preferably made whereby the rib element 5, by way of a first end, directly adjoins the collar region 12 and, by way of a second end, transitions into the region in which the rib element 5 forms the outer lateral surface 14 running parallel to the axis of rotation A.

In particular, provision is made whereby the primary cutout 21, by means of which the brake element 2 is attached to the wheel hub 1, is arranged in the core region 11, preferably in a region which is situated between the axis of rotation A and the outer lateral surface 14. Here, the primary cutout 21 runs substantially axially. Furthermore, in the embodiment illustrated in FIG. 1, provision is made whereby the primary cutout 21 extends over the entire rib element 5. By means of the arrangement of the primary cutout 21 in the relatively thick core region 11, it is advantageously possible to generate greater clamping lengths than if the primary cutout 21 for the attachment of the brake element 2 is arranged in the collar region 12. This increased clamping length is advantageously associated with an increased bracing force, which ultimately permits higher braking torques. Furthermore, thermal effects can be compensated in a relatively effective manner by means of this structural arrangement of the primary cutouts 21.

Furthermore, in the embodiment illustrated in FIG. 1a-1c, provision is made whereby the core region 11 has a brake element abutment surface 25 in which the primary cutout 21 opens out. Here, the brake element abutment surface 25 additionally comprises a positive-locking arrangement which interacts, as viewed in a direction of rotation U, with the brake element 2 in the installed state. In the present case, the positive-locking arrangement 13 is formed as a shoulder 20 on the brake element abutment surfaces 20. This is in particular a step-shaped shoulder 20. Here, the individual shoulders 20 of the brake element abutment surface project radially to different extents into the brake element abutment surface 25. In particular, provision is made whereby an edge profile 10 is to be assigned to the successive shoulders 20. Said edge profile 10 is, in the present exemplary embodiment, defined by the outer edges, in each case in a radial direction, of the shoulders 20 of the brake element abutment surfaces 25 situated in succession in the direction of rotation U. The imaginary connection of these outer edges forms, for example, a circle. Preferably, the individual shoulders 20 of the brake element abutment surfaces 25 project to different extents into the brake element abutment surface 25 such that the edge profile 10 is eccentric relative to the axis of rotation A. In particular, a central point M assigned to the edge profile 10 is offset with respect to the axis of rotation A by an eccentricity E, wherein a ratio between the eccentricity E to the extent D2 of the brake element abutment surface 25 as measured in a radial direction assumes a value between 0.2 and 0.8, preferably between 0.6 and 0.8, and particularly preferably between 0.7 and 0.8. In this way, the individual shoulders 20 form positive-locking surfaces situated at the outside in a radial direction, which positive-locking surfaces run, in particular with respect to the direction of rotation U, obliquely or in a wedge shape over the respective brake element abutment surface 25. A consequence is that the positive-locking surface interacts in a direction of rotation U with a brake-element-side positive-locking arrangement 40 which is of complementary form with respect to the positive-locking arrangement. The oblique or wedge-shaped profile of the individual positive-locking surfaces thus leads to force boosting during the rotation of the brake element 2, preferably during the rotation about the axis of rotation A. To generate the force boosting, provision is made here in particular whereby the profile of the positive-locking surface or of the shoulders is coordinated with a direction of rotation during the operation of the wheel hub 1 in order that, during braking, a braking torque can be accommodated by the positive-locking surface.

In this way, in relation to wheel hubs 1 which do not have an additional positive-locking arrangement for the positive locking in a direction of rotation, it is possible for higher braking torques to be accommodated, and a loading of the axial fixing of the brake element 2 by fastening means 51 introduced into the primary cutouts 21 is reduced. Correspondingly, demands on the fastening means 51, for example screws, can be reduced. Furthermore, by means of the eccentric orientation of the edge profile 10 that is continued over multiple shoulders 20, it is also possible for the brake element 2 to be oriented relative to the wheel hub 1, that is to say the brake element 2 can be fixed in a particular position or angular position with respect to the wheel hub 1 as viewed in a direction of rotation U.

FIGS. 2a to 2c illustrate a wheel hub 1 according to a second exemplary embodiment of the present invention. Here, FIG. 2a illustrates a plan view in an axial direction, and FIG. 2b illustrates a sectional view along the axial direction (left) and a perspective view (right). In particular, the wheel hub 1 from FIGS. 2a to 2c differs from the wheel hubs 1 from FIGS. 1a to 1c in that a groove 30 or a ring-shaped collar is provided as positive-locking arrangement 13 instead of a shoulder 20. Here, the groove 30 or the collar is arranged eccentrically with respect to the axis of rotation A of the wheel hub 1, such that the groove 30 or the collar can be assigned in each case two edge profiles 10 with the characteristics described with regard to FIGS. 1a to c. Provision is preferably made whereby a ratio between a groove width and a groove depth assumes a value between 0.5 and 3, preferably between 0.8 and 1.8 and particularly preferably between 0.9 and 1.23.

FIGS. 3a to 3c illustrate a wheel hub 1 according to a third exemplary embodiment of the present invention. Here, FIG. 3a illustrates a perspective and FIG. 3b illustrates a sectional view along the axial direction (left) and a perspective view of the brake element (right). In particular, the wheel hub 1 from FIGS. 3a to 3c differs from that from FIGS. 1a to 1c in that the positive-locking arrangement does not extend over multiple brake element abutment surfaces 25, but rather each individual brake element abutment surface 25 has a positive-locking arrangement 13. Here, the positive-locking arrangement 13 is formed as a shoulder 20 with a curved edge profile 10. Preferably, the curved edge profile 10 is to be assigned an edge profile radius, wherein the edge profile radius is smaller than an extent of the brake element abutment surface 25 as measured in a direction of rotation. In this way, the positive-locking surface assigned to the edge profile 10 can interact in positive locking fashion with the wheel hub 1 in both directions of rotation that the wheel hub 2 can assume during operation. In particular, provision is made whereby the brake-element-side positive-locking arrangement 40 has recesses of complementary form with respect to the shoulders 20 of the wheel hub 1.

Figure 4A:
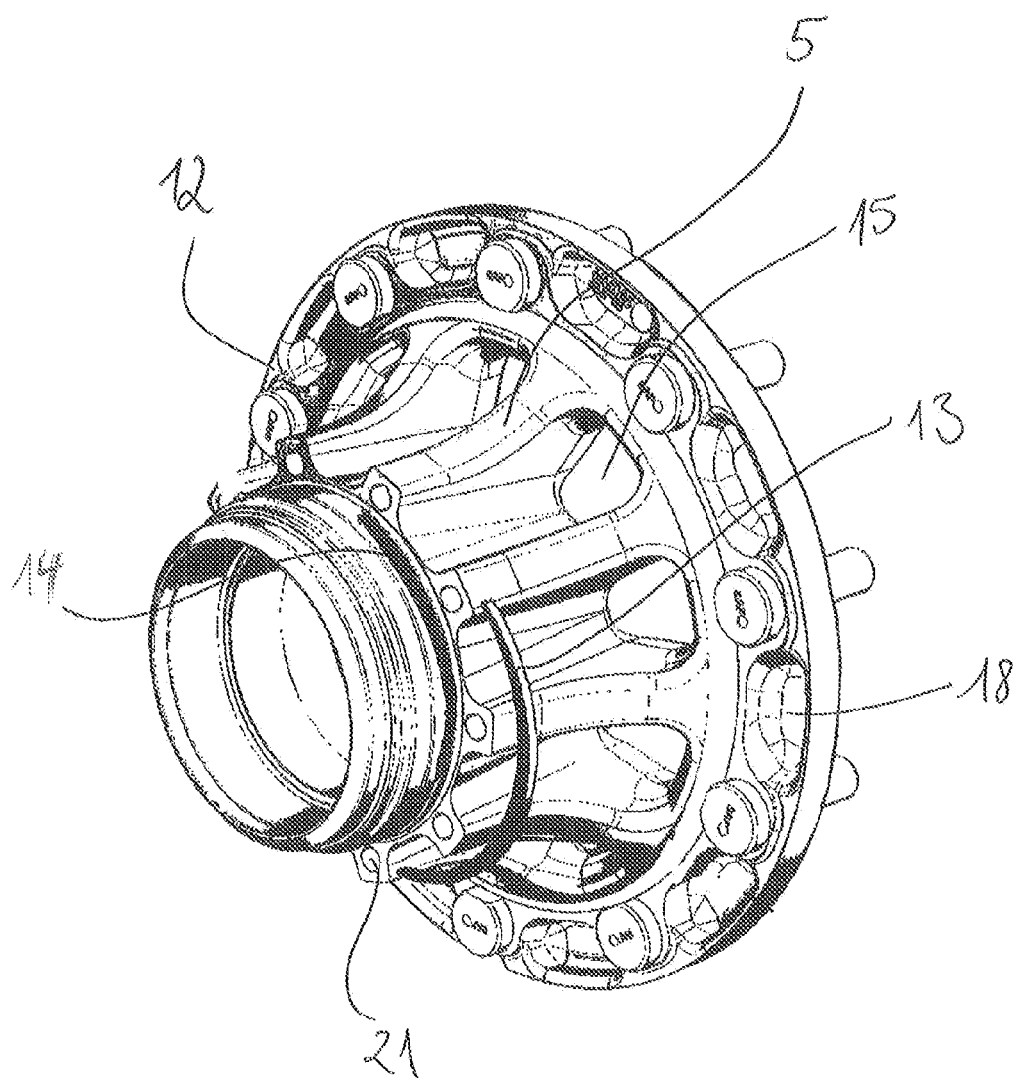
FIGS. 4a to 4d show a wheel hub according to a third exemplary embodiment of the present invention.
Figure 4B:
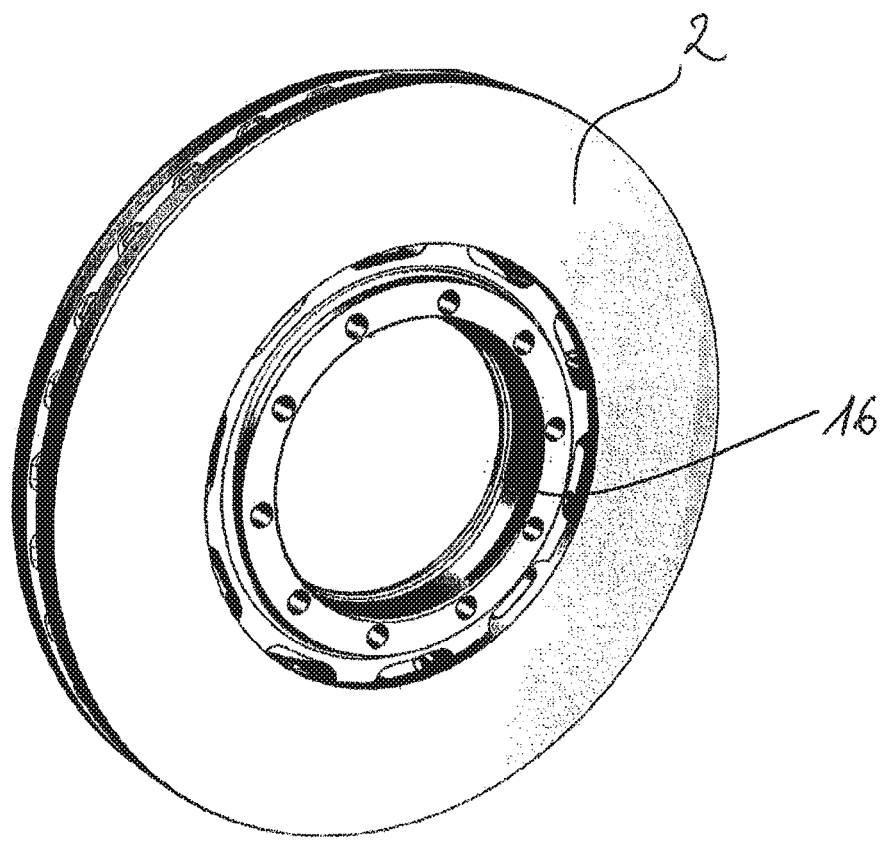
Figure 4C:
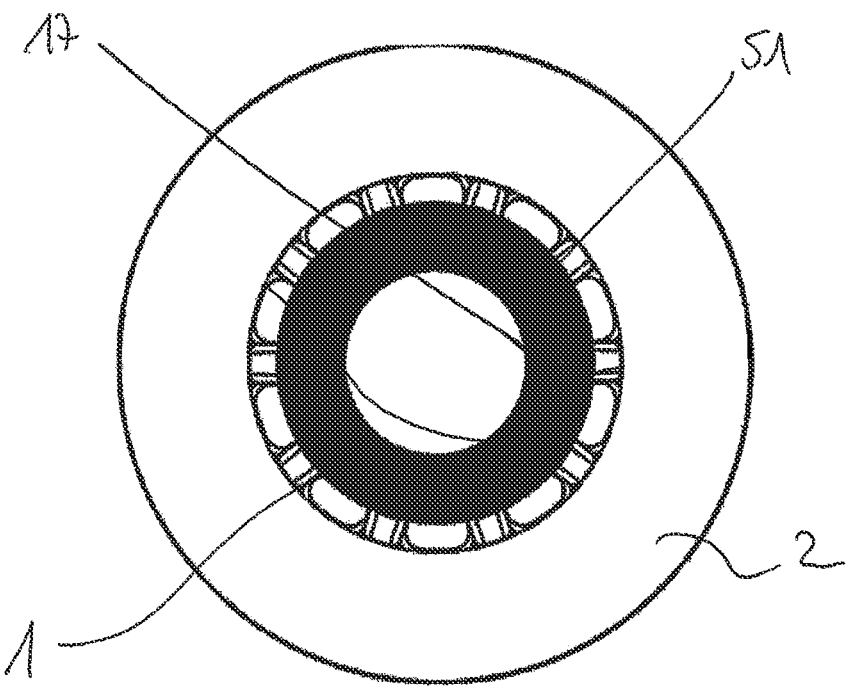
Figure 4D:
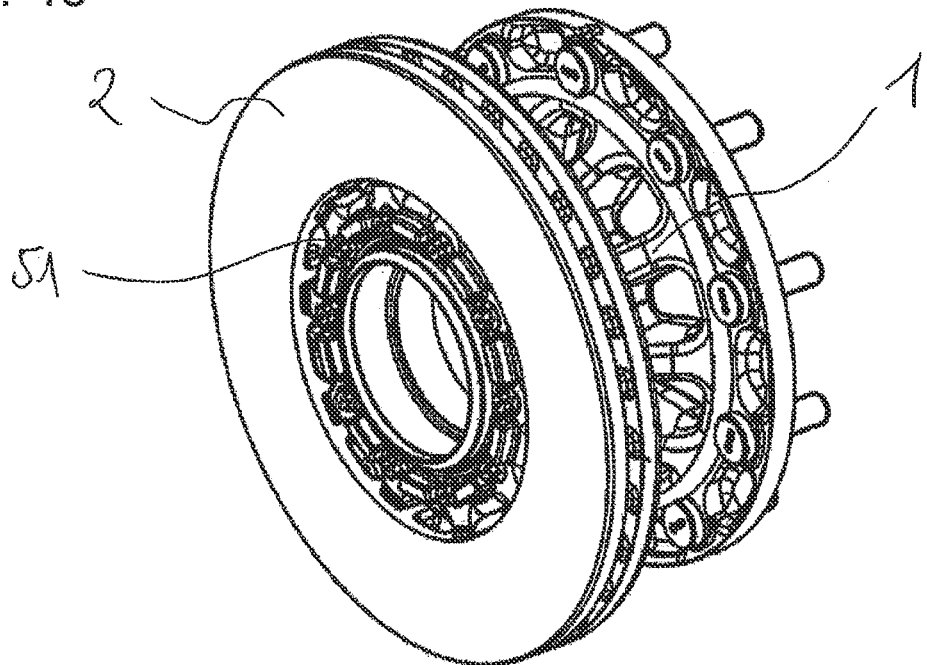

FIGS. 4a to 4d illustrate a wheel hub 1 according to a fourth exemplary embodiment of the present invention. Here, the embodiment of FIGS. 4a to 4d differs in particular only in that the positive-locking arrangement 13 is not formed in the brake element abutment surfaces, but rather a receiving region 14 for a positive-locking arrangement 13 is provided. Said receiving region 14 is preferably formed in the wheel hub 1 as an indentation running in a direction of rotation U, preferably in a region axially adjoining the brake element abutment surfaces 25. Here, the receiving region 14 extends over multiple brake element abutment surfaces 25 as viewed in a direction of rotation U. In particular, provision is made whereby a ratio between a length of the receiving region 14 as measured in a direction of rotation U to the total circumference of the wheel hub at the same height assumes a value between 0.2 and 0.7, preferably between 0.4 and 0.6 and particularly preferably between 0.45 and 0.55. The receiving region 14 formed as a recess or indentation in the wheel hub 1 has a base surface 17 which is to be assigned an edge profile 10, which in turn runs eccentrically with respect to the axis of rotation 10. In the installed state, the positive-locking arrangement 13 is arranged in the receiving region 14. In the exemplary embodiment illustrated, the positive-locking arrangement 13 is formed as a curved wedge element, which narrows toward its ends as viewed in a direction of rotation. Whereas FIG. 4a shows the receiving region 14 for the positive-locking arrangement 13 and the separate positive-locking arrangement 13, FIG. 4b shows a brake-element-side receiving region 16, into which the positive-locking arrangement 13 engages, by way of its side averted from the wheel hub 1, in the installed state. Finally, FIGS. 4c and 4d illustrate the wheel hub 1 in the installed state in a plan view and in a perspective view. As can be seen in plan view, the positive-locking arrangement 13 is, in the installed state, arranged preferably between the wheel hub 1 and the brake element 2. By means of the wedge-shaped profile of the positive-locking arrangement 13, it is advantageously possible, as is the case in the embodiments from FIGS. 1a to 1c and 2a to 2c, for the desired force boosting during the rotation of the brake element 2 to be generated.

Figure 5A:
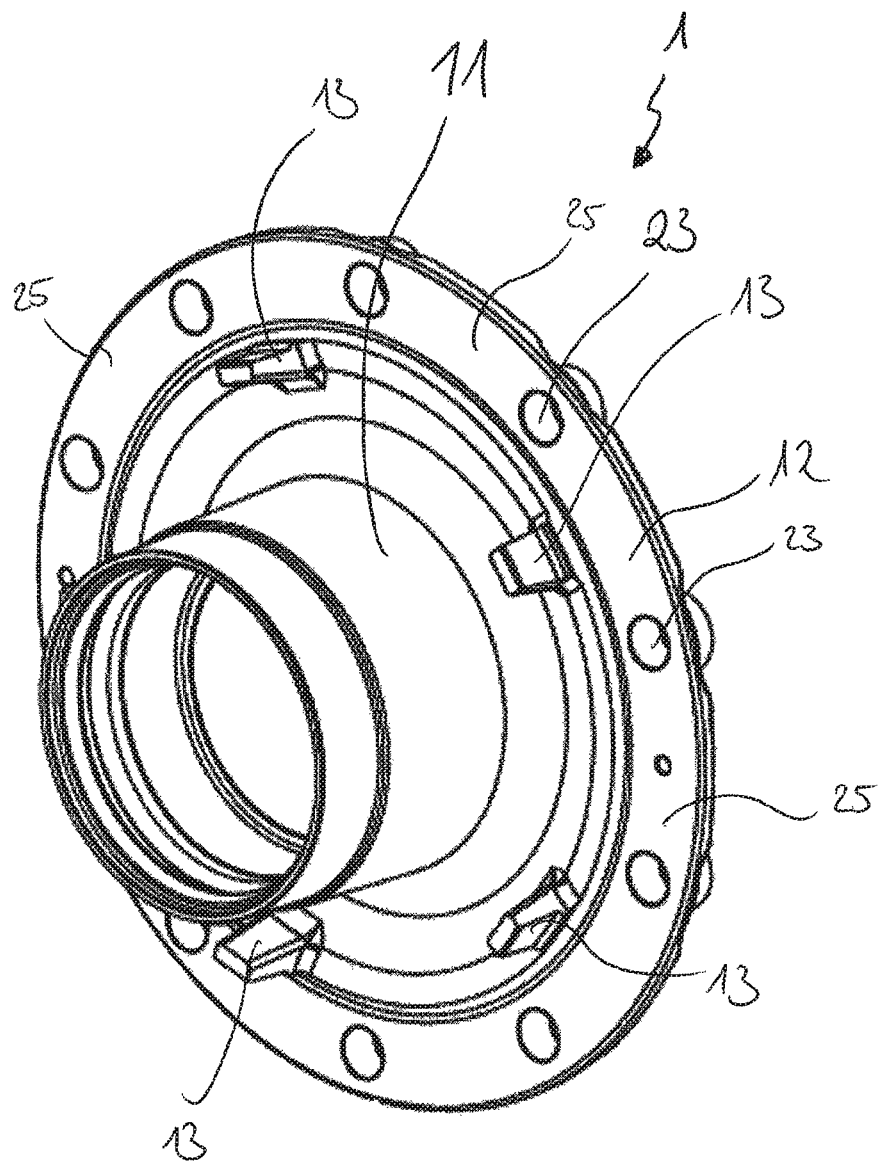
FIGS. 5a to 5d show a wheel hub according to a fourth exemplary embodiment of the present invention.
Figure 5B:
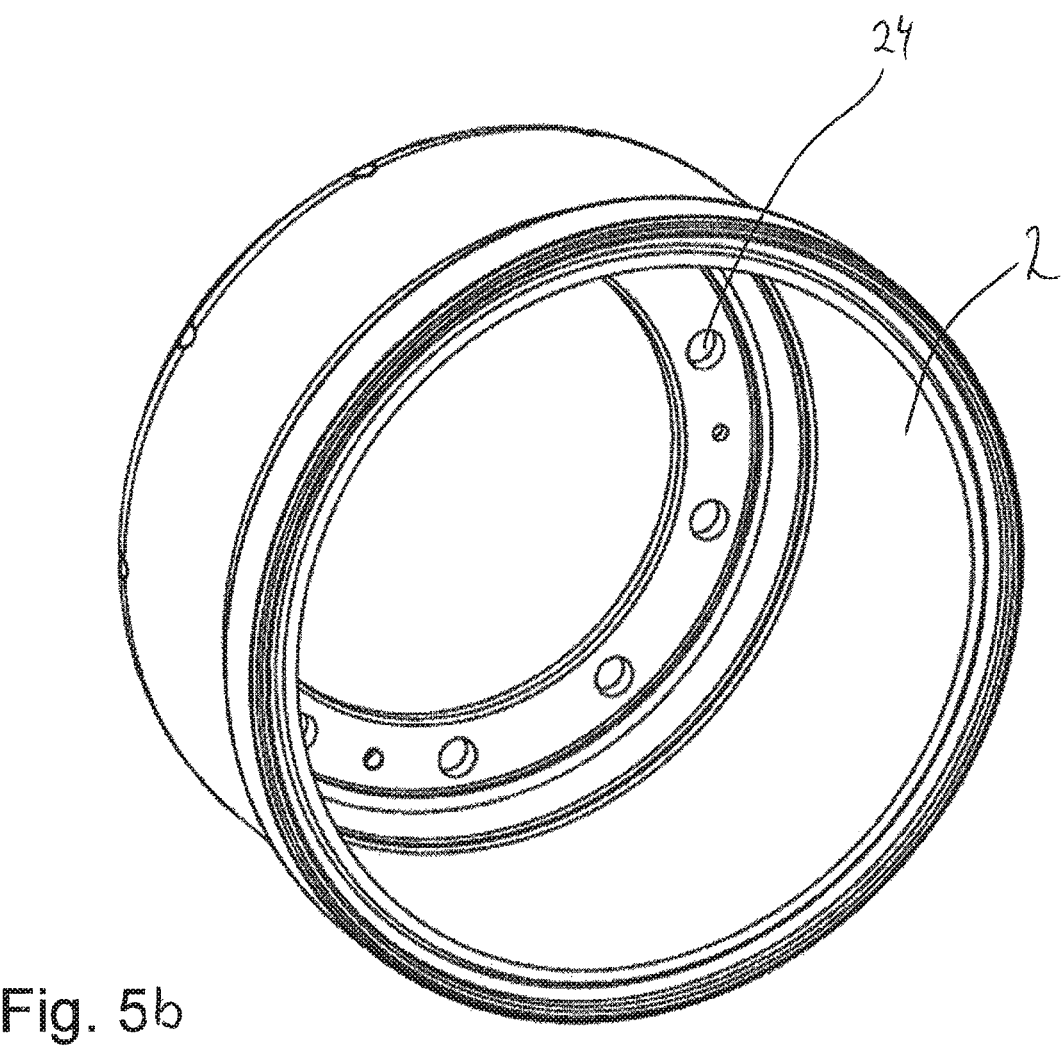
Figure 5C:
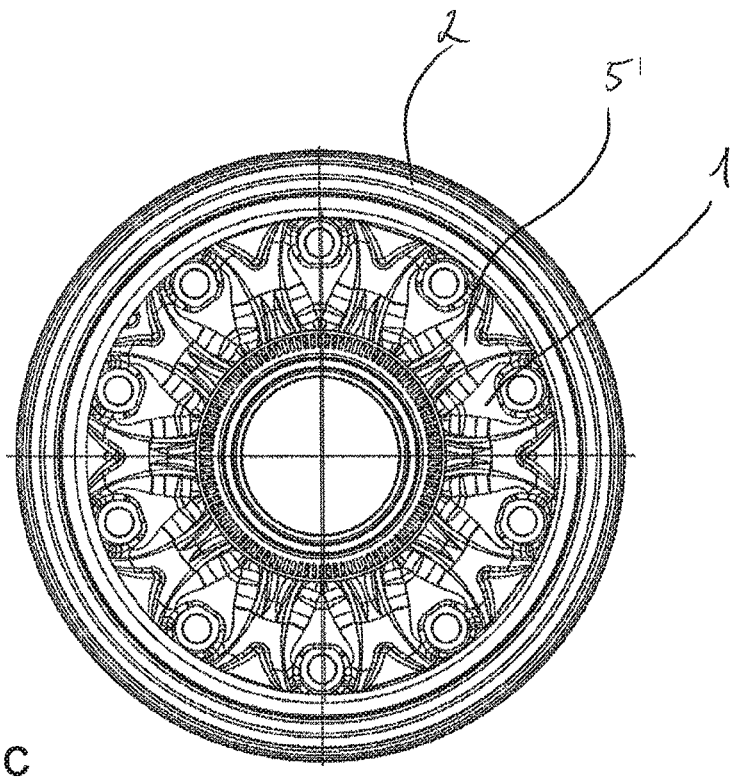
Figure 5D:
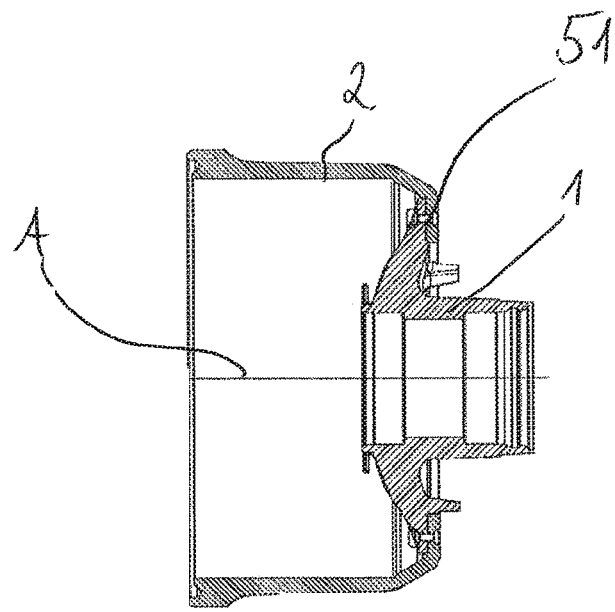

FIGS. 5a to 5d illustrate a wheel hub 1 according to a fourth exemplary embodiment of the present invention. By contrast to the embodiments of the preceding figures, a brake drum is provided as brake element 2 in the illustrated embodiment. Here, FIG. 5a shows the wheel hub 1, and FIG. 5b shows the brake drum, in each case in detail, while FIGS. 5c and 5d illustrate the assembled system composed of brake drum and wheel hub 1 in a plan view (top) and in a sectional view (bottom). Preferably, for the attachment of the brake element 2, that is to say in this case the brake drum, tertiary cutouts 23 are provided which are formed into the collar region 13 of the wheel hub 1. In particular, provision is made whereby the collar region 13 comprises the brake element abutment surface 25 for the brake drum, in particular for a collar, directed inwardly in relation to the axis of rotation A, of the brake drum. Preferably, the brake element abutment surface 25 is of closed, that is to say non-discontinuous, form as viewed in a direction of rotation. Furthermore, as positive-locking arrangement 13, webs are provided which, in the installed state, project axially from the collar region 13 of the wheel hub 1 and which are in particular arranged between two tertiary cutouts 23 as viewed in a direction of rotation U. Here, the webs are preferably formed such that, for the force boosting during a rotation of the brake element 2, the positive-locking arrangement 13, that is to say the webs, has an edge profile 10, extending in a direction of rotation U and averted from the axis of rotation A, which runs eccentrically with respect to the axis of rotation A. Here, the edge profile 10 is to be understood in particular to mean a common edge profile 10 extending over multiple webs on that side of the webs, situated in succession in a direction of rotation, which is averted from the axis of rotation A. Provision is furthermore made whereby, in the installed state, the webs project in an axial direction with respect to the collar, bearing against the brake element abutment surface 25, of the brake drum. It is also conceivable for the outer sides of the webs to run obliquely with respect to the axis of rotation A in order, during the installation of the brake drum, to guide the latter and thus simplify the mounting of the brake drum. Provision is furthermore made whereby the tertiary cutouts 23 are arranged between two rib elements 5 as viewed in a direction of rotation U.

REFERENCE SIGNS

1 Wheel hub
2 Brake element
5 Rib element
10 Edge profile
11 Core region
12 Collar region
13 Positive-locking arrangement
14 Receiving region
15 Clear region
16 Brake-element-side receiving region
17 Base surface
18 Thinned material portion
20 Shoulder
21 Primary cutout
22 Secondary cutout
23 Tertiary cutout
25 Brake element abutment surface
30 Groove
40 Brake-element-side positive-locking arrangement
51 Fastening means
A Axis of rotation
D1 Thickness of the brake element
D2 Extent of the brake element abutment surface

The invention claimed is:

1. A wheel hub for a utility vehicle, comprising:
a brake element abutment surface against which a brake element bears in an installed state, wherein the brake element includes a brake disk or a brake drum; and
at least one of a positive-locking arrangement which interacts in positively locking fashion with the brake element in the installed state as viewed in a direction of rotation, and a receiving region for a positive-locking arrangement which interacts in positively locking fashion with the brake element in the installed state as viewed in the direction of rotation;
wherein a primary relief is provided for the axial fixing of the brake element;
wherein the primary relief opens out in the brake element abutment surface; and
wherein, for force boosting during a rotation of the brake element about an axis of rotation, the positive-locking arrangement has an edge profile which extends in a direction of rotation and which runs eccentrically with respect to the axis of rotation.

2. The wheel hub as claimed in claim 1, wherein the positive-locking arrangement is arranged in the region of the brake element abutment surface or is part of the brake element abutment surface.

3. The wheel hub as claimed in claim 2, wherein the positive-locking arrangement includes at least one of a shoulder, a collar and a groove in the brake element abutment surface.

4. The wheel hub as claimed in claim 3, wherein the shoulder is one of multiple shoulders, and wherein a common edge profile extends over the multiple shoulders as viewed along the direction of rotation.

5. The wheel hub as claimed in claim 1, further comprising:
a collar region which is situated at the outside as viewed in a radial direction and a core region which is situated at the inside as viewed in a radial direction;
wherein, as viewed in an axial direction, the core region situated at the inside is thicker than the collar region situated at the outside; and
wherein the wheel hub has, in the core region situated at the inside, the primary relief for the attachment of a brake element.

6. The wheel hub as claimed in claim 5, wherein the core region comprises substantially radially running rib elements.

7. The wheel hub as claimed in claim 1 wherein the positive-locking arrangement includes at least one of a shoulder, a collar and a groove in the brake element abutment surface.

8. The wheel hub as claimed in claim 1, wherein the shoulder is one of multiple shoulders, and wherein a common edge profile extends over the multiple shoulders as viewed along the direction of rotation.

9. The wheel hub as claimed in claim 1, wherein the edge profile surrounds the axis of rotation at least in certain regions.

10. The wheel hub as claimed in claim 1, wherein a central point assigned to the edge profile is offset with respect to the axis of rotation by an eccentricity.

11. The wheel hub as claimed in claim 1, wherein the primary relief is one of a multiplicity of primary reliefs, wherein the multiplicity of primary reliefs are arranged on a circular path, and wherein the circular path is formed eccentrically with respect to the axis of rotation.

12. The wheel hub as claimed in claim 1, wherein the wheel hub is of single-piece or integral form.

13. A wheel hub for a utility vehicle, comprising:
a brake element abutment surface against which a brake element bears in an installed state, wherein the brake element includes a break disk or a brake drum; and
at least one of a positive-locking arrangement which interacts in positively locking fashion with the brake element in the installed state as viewed in a direction of rotation, and a receiving region for the positive-locking arrangement which interacts in positively locking fashion which the brake element in the installed state as viewed in the direction of rotation;
wherein a primary relief is provided for the axial fixing of the brake element;
wherein the primary relief opens out in the brake element abutment surface;
wherein the positive-locking arrangement is arranged in the region of the brake element abutment surface or is part of the brake element abutment surface;
wherein the positive-locking arrangement includes at least one of a shoulder, a collar and a groove in the brake element abutment surface;
wherein the shoulder is one of multiple shoulders, and wherein a common edge profile extends over the multiple shoulders as viewed along the direction of rotation; and
wherein, for force boosting during a rotation of the brake element about an axis of rotation, the positive-locking arrangement has an edge profile which extends in a direction of rotation and which runs eccentrically with respect to the axis of rotation.

14. The wheel hub as claimed in claim 13, wherein a central point assigned to the edge profile is offset with respect to the axis of rotation by an eccentricity.

15. The wheel hub as claimed in claim 14, wherein a ratio between the eccentricity to the extent of the brake element abutment surface as measured in a radial direction is between 0.2 and 0.8.

16. The wheel hub as claimed in claim 15, wherein the primary relief is one of a multiplicity of primary reliefs, wherein the multiplicity of primary reliefs are arranged on a circular path, and wherein the circular path is formed eccentrically with respect to the axis of rotation.

17. The wheel hub as claimed in claim 16, further comprising:
a collar region which is situated at the outside as viewed in a radial direction and a core region which is situated at the inside as viewed in a radial direction;
wherein, as viewed in an axial direction, the core region situated at the inside is thicker than the collar region situated at the outside; and
wherein the wheel hub has, in the core region situated at the inside, the substantially axially running primary relief for the attachment of a brake element.

18. The wheel hub as claimed in claim 17, wherein the core region comprises substantially radially running rib elements.

19. The wheel hub as claimed in claim 18, wherein the wheel hub is of single-piece or integral form.

20. The wheel hub as claimed in claim 15, wherein the ratio is between 0.6 and 0.8.

21. The wheel hub as claimed in claim 20, wherein the ratio is between 0.7 and 0.8.

22. The wheel hub as claimed in claim 13, wherein the edge profile surrounds the axis of rotation at least in certain regions.

23. A wheel hub for a utility vehicle, comprising:
a break element abutment surface against which a brake element bears in an installed state, wherein the brake element includes a brake disk or a brake drum; and
at least one of a positive-locking arrangement which interacts in positively locking fashion with the brake element in the installed state as viewed in a direction of rotation, and a receiving region for the positive-locking arrangement which interacts in positively locking fashion with the brake element in the installed state as viewed in the direction of rotation;
wherein a primary relief is provided for the axial fixing of the brake element;
wherein the primary relief opens out in the brake element abutment surface;
wherein a central point assigned to an edge profile of the positive locking arrangement is offset with respect to an axis of rotation by an eccentricity; and
wherein a ratio between the eccentricity to the extent of the brake element abutment surface as measured in a radial direction is between 0.2 and 0.8.

24. A brake system, comprising:
a brake element; and
a wheel hub for a utility vehicle;
wherein the wheel hub has a brake element abutment surface against which a brake element bears in an installed state, and at least one of a positive-locking arrangement which interacts in positively locking fashion, as viewed in a direction of rotation, with the brake element in the installed state, and a receiving region for the positive-locking arrangement which interacts in positively locking fashion, as viewed in a direction of rotation, with the brake element in the installed state;
wherein the wheel hub has a primary relief for the axial fixing of the brake element;
wherein the primary relief opens out in the brake element abutment surface;
wherein the positive-locking arrangement interacts, in the installed state, with a brake-element-side positive-locking arrangement, in particular a brake-element-side positive-locking arrangement which is of complementary design with respect to the positive-locking arrangement of the wheel hub; and
wherein, for force boosting during a rotation of the brake element about an axis of rotation, the positive-locking arrangement has an edge profile which extends in a direction of rotation and which runs eccentrically with respect to the axis of rotation.

* * * * *